United States Patent
Amundson et al.

(10) Patent No.: US 7,334,441 B1
(45) Date of Patent: Feb. 26, 2008

(54) ELECTRONIC VEHICLE KEY AND HOUSING ASSEMBLY

(75) Inventors: Robert Amundson, Howell, MI (US); Mark G. Feldman, Farmington Hills, MI (US); Roberto Tomassi, Livonia, MI (US); John Stack, Shelby Township, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 11/653,574

(22) Filed: Jan. 16, 2007

(51) Int. Cl.
*B65R 25/02* (2006.01)

(52) U.S. Cl. .............................. 70/252; 70/389; 70/408; 307/10.1

(58) Field of Classification Search .................. 70/252, 70/408, 278.2, 389, 245, 248, 182–186; 307/10.1–10.3
See application file for complete search history.

(56) References Cited

U.S. PATENT DOCUMENTS

| | | | | |
|---|---|---|---|---|
| 3,527,071 | A * | 9/1970 | Warnod | 70/252 |
| 3,851,505 | A * | 12/1974 | Wilkinson | 70/255 |
| 3,959,996 | A * | 6/1976 | Thirion | 70/186 |
| 4,309,882 | A * | 1/1982 | Maiocco | 70/186 |
| 4,352,278 | A * | 10/1982 | Neyret | 70/252 |
| 4,601,184 | A * | 7/1986 | Doinel | 70/360 |
| 4,685,313 | A * | 8/1987 | Neyret | 70/186 |
| 4,716,748 | A * | 1/1988 | Watanuki et al. | 70/252 |
| 4,898,010 | A * | 2/1990 | Futami et al. | 70/278.1 |
| 4,981,026 | A * | 1/1991 | Sakuno et al. | 70/186 |
| 5,289,707 | A * | 3/1994 | Suzuki | 70/252 |
| 5,841,363 | A | 11/1998 | Jakob et al. | |
| 6,237,378 | B1 * | 5/2001 | Canard | 70/252 |
| 6,351,206 | B1 * | 2/2002 | Schweiger et al. | 340/5.64 |
| 6,354,117 | B1 * | 3/2002 | Canard | 70/186 |
| 6,389,856 | B1 * | 5/2002 | Watanuki et al. | 70/186 |
| 6,442,985 | B1 * | 9/2002 | Watanuki et al. | 70/186 |
| 6,539,762 | B1 * | 4/2003 | Wittwer | 70/423 |
| 6,546,768 | B1 | 4/2003 | Burghoff et al. | |
| 6,776,016 | B1 | 8/2004 | Wittwer et al. | |
| 6,803,675 | B2 * | 10/2004 | Harada et al. | 307/10.3 |
| 6,941,779 | B2 * | 9/2005 | Shigeyama et al. | 70/186 |
| 6,986,272 | B2 | 1/2006 | Sandvoss et al. | |
| 2004/0025549 | A1 * | 2/2004 | Sandvoss et al. | 70/252 |
| 2005/0166651 | A1 | 8/2005 | Stoschek et al. | |
| 2005/0235712 | A1 * | 10/2005 | Yukihara et al. | 70/252 |
| 2006/0010944 | A1 | 1/2006 | Balko et al. | |
| 2006/0071555 | A1 | 4/2006 | Borngraber et al. | |

FOREIGN PATENT DOCUMENTS

| | | |
|---|---|---|
| EP | 0 937 610 A2 | 8/1999 |
| EP | 1 008 506 A2 | 6/2000 |
| EP | 1 279 576 A2 | 1/2003 |
| EP | 1 419 944 B1 | 1/2006 |
| WO | WO 02/075669 | 9/2002 |

* cited by examiner

*Primary Examiner*—Suzanne Dino Barrett
(74) *Attorney, Agent, or Firm*—MacMillan, Sobanski & Todd, LLC

(57) ABSTRACT

A starter assembly for a vehicle includes a housing adapted to be coupled to a vehicle ignition system. A carrier has a key opening and is movably mounted within the housing. A latch is movably mounted to the carrier and is movable between a first latch position and a second latch position. An electronic key is provided to be received in the key opening of the carrier. The key has a first end, a second end, and a longitudinal axis. The first end includes a first end wall. The first end wall has an opening defining an axially extending cavity therein.

17 Claims, 5 Drawing Sheets

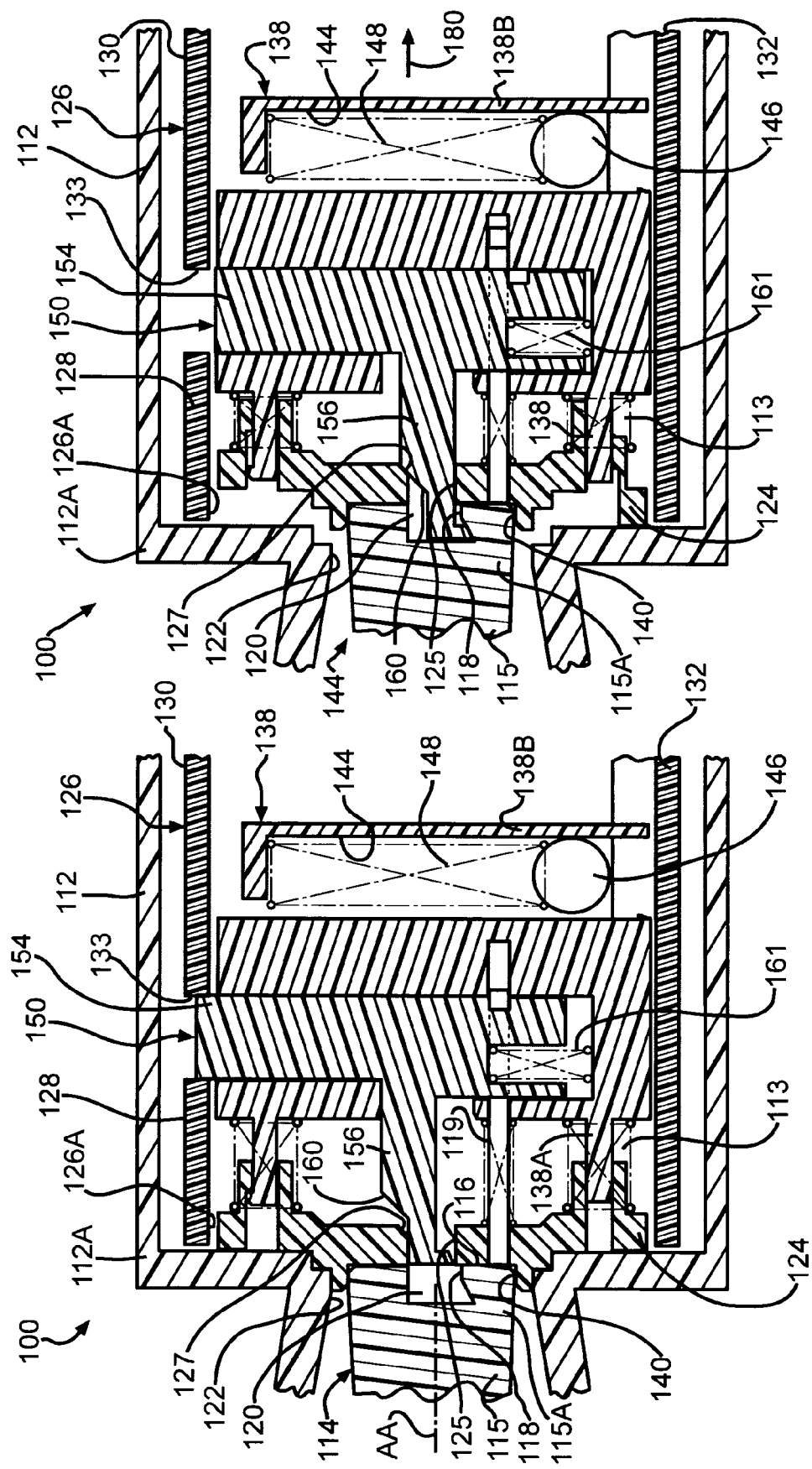

ELECTRONIC VEHICLE KEY AND HOUSING ASSEMBLY

BACKGROUND

Various embodiments of a starter assembly are described herein. In particular, the embodiments described herein relate to an improved starter assembly for starting a vehicle with an electronic key.

Devices for starting a motor vehicle with an electronic key are well known. One known device is disclosed in U.S. Pat. No. 6,776,016 to Wittwer et al. and includes a key inserted in a slot in a housing. The key can be displaced to various key positions corresponding to different control functions of the motor vehicle. The key (50) is force-fit in the slot in a first position. In a second position, the key (50) is secured by a lock assembly in an automatically locking positive fit. The key (50) is then pushed to a third final position in which the lock assembly on the key can be released. In the second position, retaining arms (21) are disposed within grooves or notches (42) formed in an outer surface of the key (50). The vehicle may be started by a push-button actuator (35) provided in the device housing.

European Patent No. EP 1 419 944 discloses starter lock system having a push-push mechanism for inserting, retaining, and removing the key (2) in the housing (4). The key (2) is retained by a lever (20) urged into a recess (23) formed in an outer surface of the key (2).

SUMMARY

The present application describes various embodiments of a starter assembly. One embodiment of the starter assembly includes a housing adapted to be coupled to a vehicle ignition system. A carrier has a key opening and is movably mounted within the housing. A latch is movably mounted to the carrier and is movable between a first latch position and a second latch position. An electronic key is provided to be received in the key opening of the carrier. The key has a first end, a second end, and a longitudinal axis. The first end includes a first end wall. The first end wall has an opening defining an axially extending cavity therein.

Advantages of the starter assembly will become apparent to those skilled in the art from the following detailed description, when read in light of the accompanying drawings.

BRIEF DESCRIPTION OF THE DRAWINGS

FIG. 9 is a sectional top elevational view of a second embodiment of the vehicle starter assembly illustrated in FIG. 1 and showing the key in the initial insertion position.

FIG. 10 is a sectional top elevational view of the vehicle starter assembly illustrated in FIG. 9 and showing the key in the second insertion position.

DETAILED DESCRIPTION OF THE INVENTION

Figure 1:
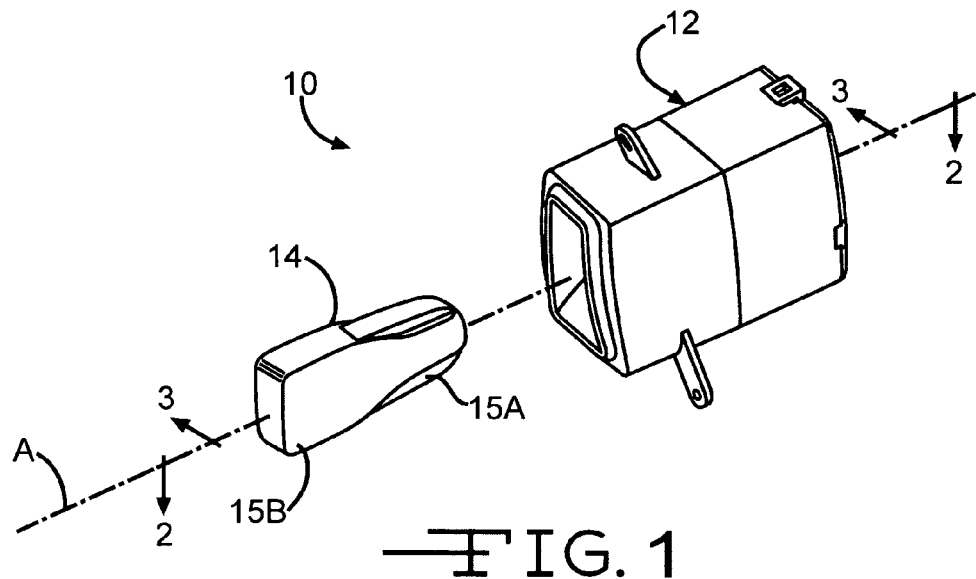
FIG. 1 is a perspective view of a first embodiment of the vehicle starter assembly.

Referring now to the drawings, and to FIG. 1 in particular, a vehicle starter assembly is shown generally at 10. The illustrated vehicle starter assembly 10 includes a housing 12 and an electronic ignition key fob or electronic key 14. The illustrated electronic key 14 includes a key body 15 having first end 15A, a second end 15B and a longitudinal axis A. The electronic key 14 may include a radio frequency (RF) transponder (not shown) mounted within the key body 15. The signal generated by the RF transponder may be read by a radio frequency (RF) coil mounted on a printed circuit board 70 in the housing 12, described in detail below.

In the illustrated embodiment, the housing 12 is structured and configured to be coupled to a vehicle ignition system (not shown). The housing 12 may include a first housing portion 12A (to the left when viewing FIG. 2) and a second housing portion 12B (to the right when viewing FIG. 2). It will be understood the housing 12 may alternatively comprise a single piece or may be an assembly comprising two or more component pieces. It will be further understood that the key 14 may have any desired external shape and size other than shown in the exemplary embodiments illustrated in the figures. The housing 12 may also have any desired external shape and size other than shown in the exemplary embodiments illustrated in the figures.

Figure 2:
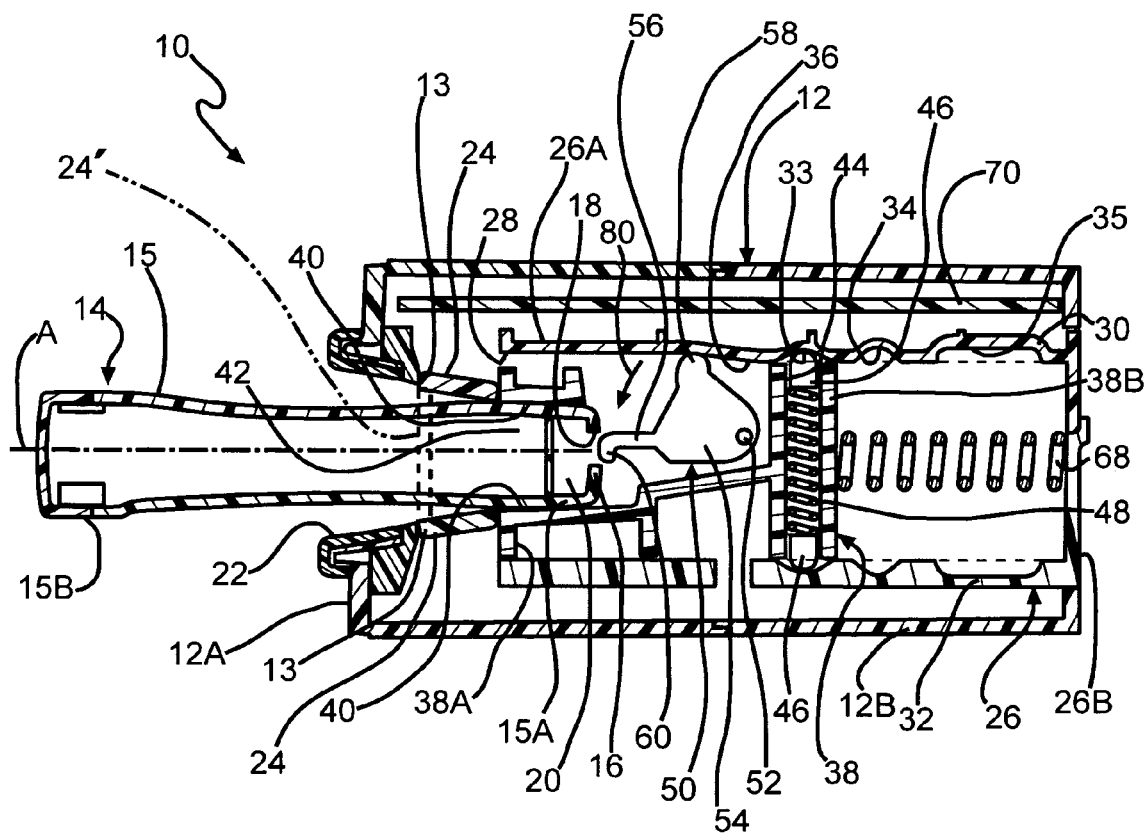
FIG. 2 is a sectional top elevational view of the vehicle starter assembly taken along the line 2-2 in FIG. 1 and showing the key in the initial insertion position.

Referring now to FIG. 2, the key 14 further includes a first end wall 16 having an opening 18. The illustrated opening 18 defines access to an axially extending cavity 20 in the first end 15A of the key 14.

The first housing portion 12A includes an opening 22 formed in a first end thereof. A pair of doors 24 (illustrated in an open position in FIG. 2) are pivotally mounted in the housing 12 adjacent the opening 22 about pivot points 13. A pair of first springs (not shown) urges the doors 24 into a closed position as shown by the phantom line 24' in FIG. 2.

A frame 26 is mounted within the housing 12 and includes a first end 26A having an opening 28 and a second or closed end 26B. In the embodiment illustrated in FIG. 2, the frame 26 includes a first wall 30 opposite a second wall 32. A first groove or recess 33, a second groove or recess 34, and a third, elongated groove or recess 35 are respectively formed in an inner surface of the first and second walls 30 and 32 at the closed end 26B of the frame 26. The first wall 30 includes a tapered portion 36 defining a camming surface intermediate the first end 26A and the first recess 33 of the frame 26.

In the illustrated embodiment, a carrier 38 in mounted for sliding movement within the frame 26. The illustrated carrier 38 includes a first end 38A and a second end 38B. The first end 38A includes wall surfaces 40 defining an opening 42 for receiving the electronic key 14. The wall surfaces 40 define support surfaces for the key 14. A detent channel 44 is formed in the second end 38B of the carrier 38.

A pair of detent pins or plungers 46 are disposed in the channel 44 and biased outwardly by a second spring 48. It will be understood that the plungers 46 may have any desired shape, such as for example, substantially spherical.

Figure 3:
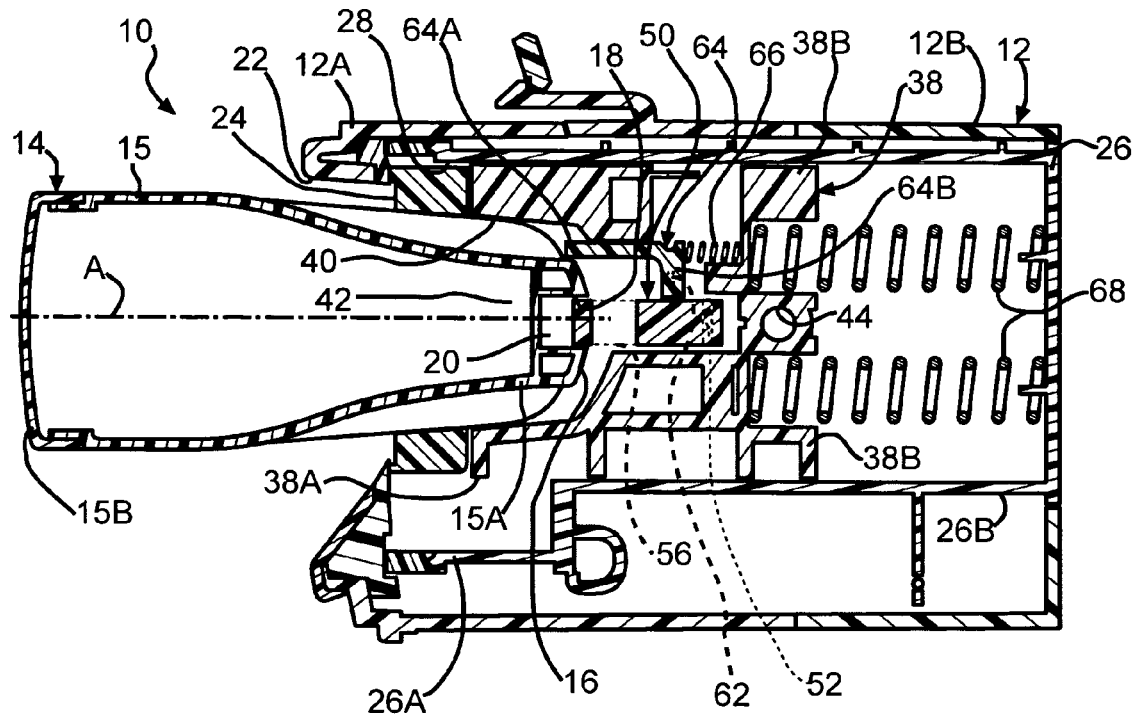
FIG. 3 is a sectional side elevational view of the vehicle starter assembly taken along the line 3-3 in FIG. 1 and showing the key in the initial insertion position.
Figure 5:
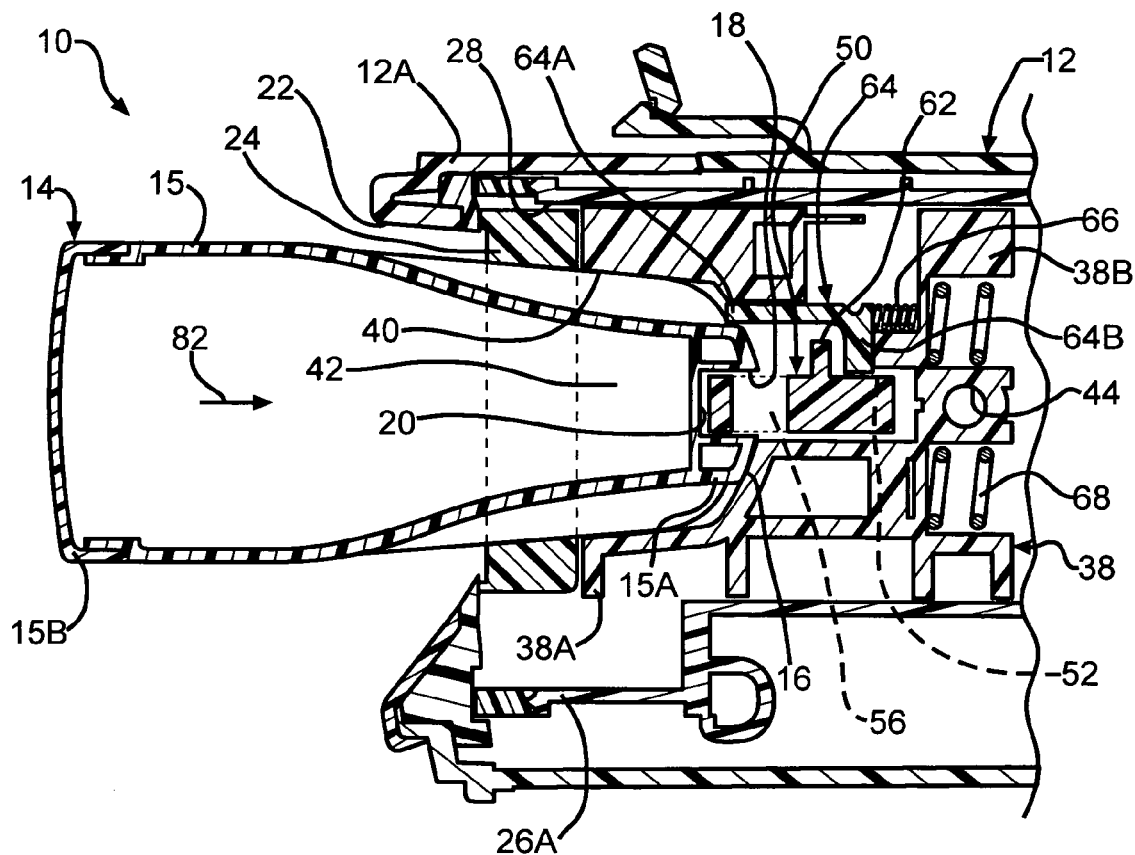
FIG. 5 is a sectional side elevational view of the vehicle starter assembly taken along the line 3-3 in FIG. 1 and showing the key in the second insertion position.

A latch 50 is pivotally mounted within the carrier 38 by a pin 52. The latch 50 includes a latch body 54, a radially outwardly extending latch arm 56, and a cam member 58. In the illustrated embodiment, a distal end of the latch arm 56 includes a lip 60 extending transversely to an axis of the latch arm 56. As best shown in FIGS. 3 and 5, a latch boss 62 extends outwardly (upwardly as viewed in FIGS. 3 and 5) of the latch body 54. A third spring (not shown) is disposed between the latch 50 and the carrier 38 and urges the latch 50 into a first or unlatched position as illustrated in FIGS. 2 and 3.

In the embodiments illustrated in FIGS. 1 through 8, a latch release plunger 64 is mounted within the carrier 38. The plunger 64 is substantially "L" shaped in section, and includes a first portion 64A and a second portion 64B. A fourth spring 66 is disposed between the plunger 64 and the second end 38B of the carrier 38 and urges the plunger 64 away (to the left as viewed in FIGS. 3 and 5) from the second end 38B of the carrier 38.

A pair of fifth springs 68 is disposed between an outside surface of the second end 38B of the carrier 38 and the frame 26, and urges the carrier 38 away (to the left as viewed in FIGS. 2 and 3) from the second end 26B of the frame 26.

As best shown in FIG. 3, the latch boss 62 engages the plunger 64, thereby preventing the latch 50 from pivoting about the pin 52 and retaining the latch 50 in the unlatched position illustrated in FIG. 3. In the unlatched position as best shown in FIG. 2, the cam member 58 engages the tapered portion 36 of the first wall 30 of the frame 26, and the carrier 38 is urged toward the first end 26A of the frame 26 by the force of the springs 68.

In the embodiment illustrated in FIG. 2, the printed circuit board (PCB) 70 is disposed between the frame 26 and the housing 12. The PCB 70 may include any desired electronic components, such as, for example, an LED (not shown), a plurality of micro-switches (not shown), an electrical connector (not shown) for connecting the PCB 70 to a source of power (not shown), and an RF coil (not shown).

In operation, the vehicle starter assembly 10 may be moved through a plurality of operational positions. Although five operational positions are described herein below, it will be understood that the starter assembly 10 may be structured and configured to move through any desired number of operational positions.

A vehicle operator may first insert the key 14 into the opening 22 of the housing 12 into a first insertion position, as shown in FIGS. 2 and 3. As the key 14 is inserted into the opening 22, the doors 24 are moved from the closed position 24' to the open position, as shown in FIG. 2. In the first insertion position, the first end 15A of the key 14 is inserted into the housing 12 (to the right as viewed in FIGS. 2 and 3) until the first end 15A of the key 14 engages the first portion 64A of the latch release plunger 64. In the first insertion position, the latch 50 is in the unlatched position, and the plungers 46 are urged outwardly of the carrier 38 and are seated within the first recesses 33 of the frame 26.

Figure 4:
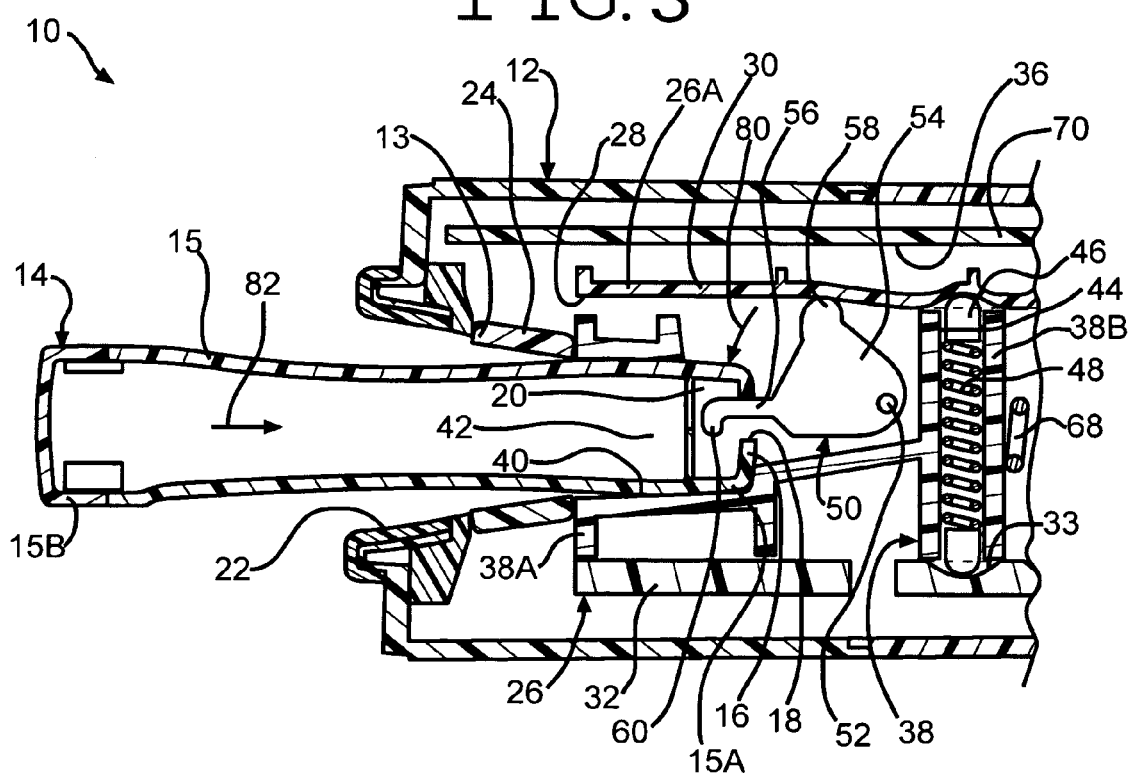
FIG. 4 is a sectional top elevational view of the vehicle starter assembly taken along the line 2-2 in FIG. 1 and showing the key in the second insertion position.

The vehicle operator may then apply a force in the direction of the arrow 82 (to the right as viewed in FIGS. 4 and 5) on the key 14 to move the key 14 into a second insertion position, as shown in FIGS. 4 and 5. In the second insertion position, the force applied to the key 14 urges the plunger 64 against the force of the fourth spring 66 and toward the second end 38B of the carrier 38, as best shown in FIG. 5. The latch boss 62 thereby becomes disengaged from the second portion 64B of the plunger 64, and the arm 56 of the latch 50 is moved to a position within the cavity 20 of the key 14.

Figure 6:
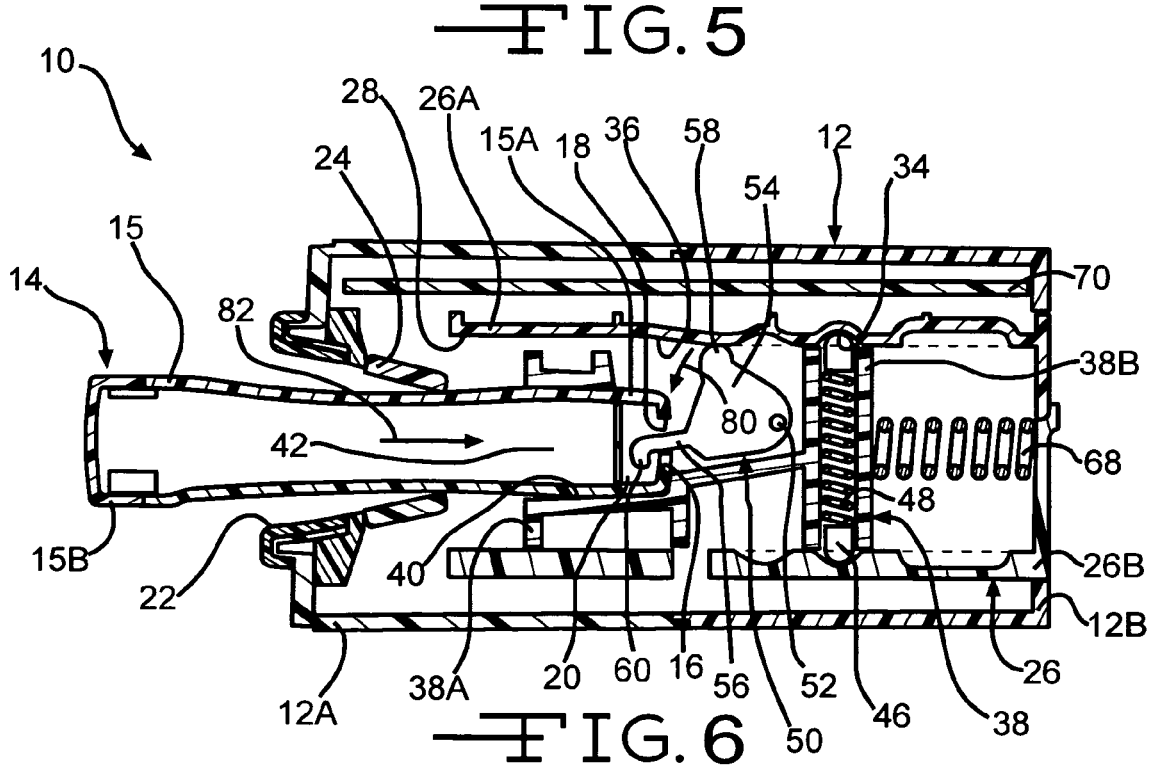
FIG. 6 is a sectional top elevational view of the vehicle starter assembly taken along the line 2-2 in FIG. 1 and showing the key in the third insertion position.

The vehicle operator may then apply an additional force in the direction of the arrow 82 (to the right as viewed in FIG. 6) on the key 14 to move the key 14 into a third insertion position, as shown in FIG. 6. In the third insertion position, the force applied to the key 14 urges the carrier 38 against the force of the pair of fifth springs 68 and toward the second end 26B of the frame 26, until the plungers 46 of the carrier 38 are seated within the second recesses 34 of the frame 26. In the illustrated embodiment, the cam member 58 of the latch 50 is caused to slide along the tapered portion 36 of the first wall 30 of the frame 26, thereby causing the latch 50 to pivot about the pin 52, in the direction of the arrow 80, and thereby move from the unlatched position, as shown in FIGS. 2 through 5, to the latched position, as shown in FIG. 6.

In the latched position illustrated in FIG. 6, the latch arm 56 moves (in a counterclockwise direction as viewed in FIG. 6) within the opening 18 until the arm 56 engages a portion of the surface of the opening 18. In the illustrated latched position, the key 14 is prevented from falling out of the housing (or moving to the left as viewed in FIG. 6) by the lip 60 engaging the first end wall 16 adjacent the opening 18 in the first end 15A of the key body 15. In the third insertion position, a signal from the RF transponder in the key 14 may be read by the RF coil on the PCB 70, indicating that the key 14 is in a position commonly referred to as the auxiliary position.

Figure 7:
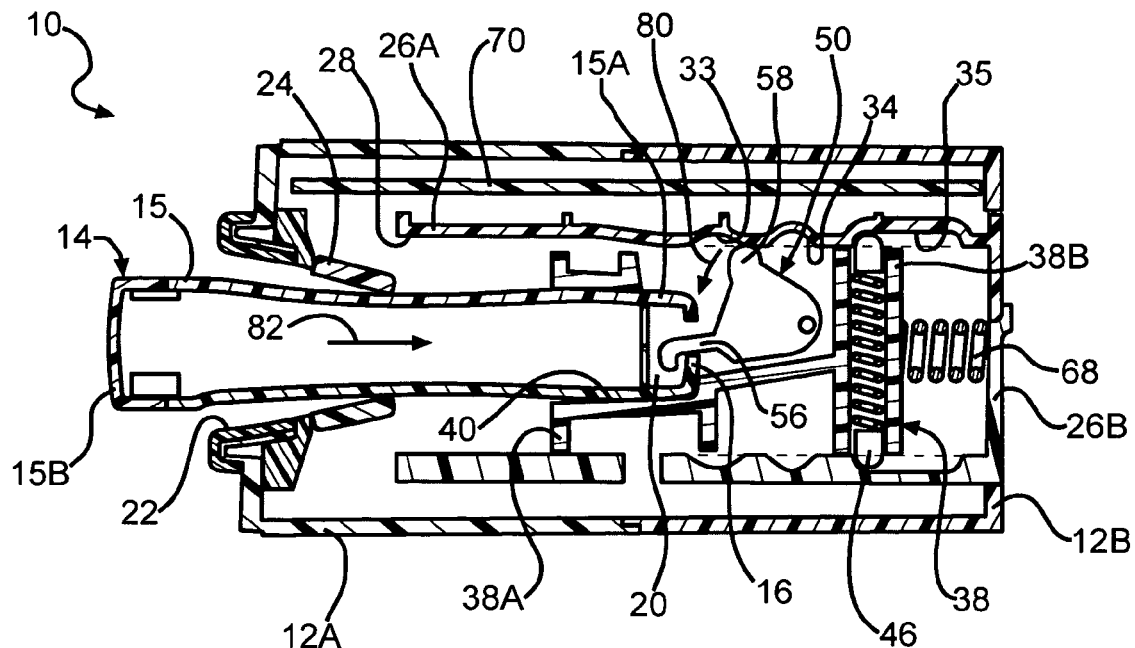
FIG. 7 is a sectional top elevational view of the vehicle starter assembly taken along the line 2-2 in FIG. 1 and showing the key in the fourth insertion position.

The vehicle operator may then continue to move the key 14 in the direction of the arrow 82 into a fourth insertion position, such that the vehicle starter assembly 10 is in the ignition position, as illustrated in FIG. 7. In the ignition position, the carrier 38 is urged toward the closed end 26B of the frame 26 until the detent plungers 46 are urged outward of the carrier 38 and into first ends of the elongated third recesses 35 (the left ends of the recesses 35 when viewing FIG. 7). In the fourth insertion position, a signal from the RF transponder in the key 14 may be read by the RF coil on the PCB 70, indicating that the key 14 is in a position commonly referred to as the ignition or run position.

Figure 8:
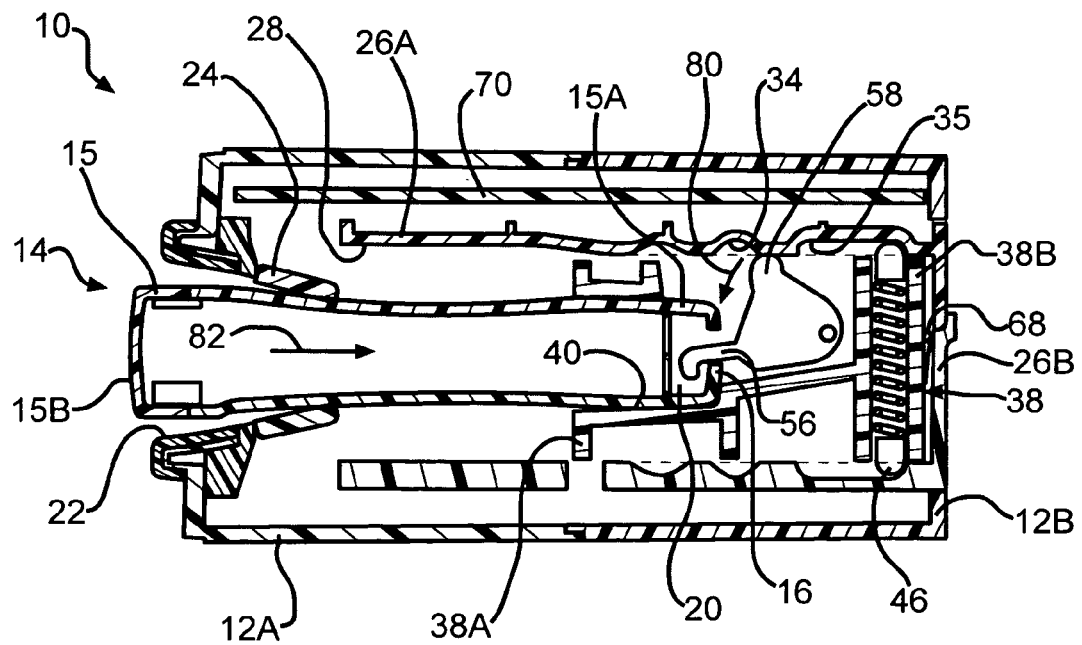
FIG. 8 is a sectional top elevational view of the vehicle starter assembly taken along the line 2-2 in FIG. 1 and showing the key in the fifth insertion position.

To start the vehicle, the vehicle operator may then continue to move the key 14 in the direction of the arrow 82 into a fifth insertion position such that the vehicle starter assembly 10 is moved to the crank or start position as illustrated in FIG. 8. In moving toward the crank position, the carrier 38 is urged further toward the closed end 26B of the frame 26 and the detent plungers 46 slide along the elongated recesses 35 to the second ends of the elongated recesses 35 (the right ends of the recesses 35 when viewing FIG. 8). In the fifth insertion position, a signal from the RF transponder in the key 14 may be read by the RF coil on the PCB 70, indicating that the key 14 is in a position commonly referred to as the crank or start position. When the operator removes the force applied to the key 14, the springs 68 urge the carrier 38 back to the ignition position as shown in FIG. 7.

To remove the key 14, the vehicle operator may apply a force to move the key 14 outward of the housing 12 (to the left when viewing FIG. 7) and through the auxiliary position illustrated in FIG. 6, the second insertion position illustrated in FIGS. 4 and 5, and the first insertion position illustrated in FIGS. 2 and 3.

Referring now to FIG. 9, a second embodiment of a vehicle starter assembly is shown generally at 100. The illustrated vehicle starter assembly 100 is shown in the first insertion position and includes a housing 112 and an electronic key 114. The illustrated electronic key 114 includes a key body 115 having first end 115A, a second end (not shown) and a longitudinal axis AA. The electronic key 114 may include an RF transponder (not shown) mounted within the key body 115.

In the illustrated embodiment, the housing 112 is structured and configured to be coupled to a vehicle ignition system (not shown). It will be understood the housing 112 may comprise a single piece or may be an assembly comprising two or more component pieces. It will be further understood that the key 114 may have any desired external shape and size other than shown in the exemplary embodiments illustrated in the figures. The housing 112 may also have any desired external shape and size other than shown in the exemplary embodiments illustrated in the figures.

The illustrated key 114 further includes a first end wall 116 having an opening 118. The illustrated opening 118 defines access to an axially extending cavity 120 in the first end 115A of the key 114.

The housing 112 includes an opening 122 formed in a first end 112A thereof. A door 124 (illustrated in a closed position in FIG. 9) is slidably mounted in the housing 112 adjacent the opening 122. Springs 113 and 119 urge the door 124 into the closed position (to the left as viewed in FIG. 9) as shown in FIG. 9. The door 124 includes an opening 125 having at least one first ramped surface 127, the purpose for which will be described in detail herein below.

A frame 126 is mounted within the housing 112, and includes a first end 126A having an opening 128, and a second or closed end (not shown). In the embodiment illustrated in FIG. 9, the frame 126 includes a first wall 130 opposite a second wall 132. A latch aperture 133 is formed in the first wall 130.

In the illustrated embodiment, a carrier 133 is mounted for sliding movement within the frame 126. The illustrated carrier 138 includes a first end 138A and a second end 138B. The first end 38A includes wall surfaces 140 for receiving the electronic key 114. The wall surfaces 140 define support surfaces for the key 114. A detent channel 144 is formed in the second end 138B of the carrier 138. A detent member or ball 146 is disposed in the channel 144 and biased outwardly by a second spring 148. Although the detent member 146 is illustrated as spherical in shape, it will be understood that the detent member 146 may have any desired shape, such as for example, the shape of the plungers 46 illustrated in FIGS. 4, 6, 7, and 8.

A latch 150 is slidingly mounted within the carrier 138. The latch 150 includes a latch body 154 and an outwardly (to the left as viewed in FIG. 9) extending latch arm 156. In the illustrated embodiment, a distal end of the latch arm 156 includes a second ramped surface 160. A third spring 161 is disposed between the latch 150 and the carrier 138 and urges the latch 150 into a first or latched position within the latch aperture 133 (upwardly as viewed in FIG. 9).

In operation, the second embodiment of the vehicle starter assembly 100 may be moved through the plurality of operational positions described herein above. It will be understood that the starter assembly 100 may be structured and configured to move through any desired number of operational positions.

A vehicle operator may first insert the key 114 into the opening 122 of the housing 112 into a first insertion position, as shown in FIG. 9. In the first insertion position, the first end 115A of the key 114 is inserted into the housing 112 (to the right as viewed in FIG. 9) until the first end wall 116 of the key 114 engages the door 124 and the wall surface 140. In the first insertion position, the latch body 154 is urged into the aperture 133 and the latched position.

The vehicle operator may then apply a force in the direction of the arrow 180 (to the right as viewed in FIG. 10) on the key 114 to move the key 114 into a second insertion position, as shown in FIG. 10. In the second insertion position, the force applied to the key 114 urges the door 124 against the force of the springs 113 and 119 and toward the second end 138B of the carrier 138, as best shown in FIG. 10. In the illustrated embodiment, the first ramped surface 127 engages the second ramped surface 160 as the door 124 moves toward the second end 138B. The engagement of the first ramped surface 127 against the second ramped surface 160 causes the latch 150 to slide away from the frame 126 (downwardly as viewed in FIG. 10). The latch 150 thereby becomes disengaged from the aperture 133.

The vehicle operator may then apply an additional force in the direction of the arrow 180 (to the right as viewed in FIG. 10) on the key 114 to move the key 114 into third and subsequent insertion positions, as described herein above. In the third and subsequent insertion positions, the ball 146 of the carrier 138 may become seated within recesses (not shown) of the frame 126.

The principle and mode of operation of the vehicle starter assembly have been described in its various embodiments. However, it should be noted that the starter assembly described herein may be practiced otherwise than as specifically illustrated and described without departing from its scope.

What is claimed is:

1. A starter assembly for a vehicle comprising:
    a housing adapted to be coupled to a vehicle ignition system;
    a carrier having a key opening and movably mounted within said housing;
    a latch pivotably mounted to said carrier and movable between a first latch position and a second latch position; and
    an electronic key having a first end, a second end, and a longitudinal axis, said first end including a first end wall, said first end wall having an opening defining an axially extending cavity therein, said key being received in said key opening of said carrier, said latch having a portion that selectively extends through said opening of said electronic key.

2. The starter assembly according to claim 1, wherein said latch is spring biased relative to said carrier.

3. The starter assembly according to claim 1, further including a release plunger adjacent said latch.

4. The starter assembly according to claim 3, wherein said release plunger is spring biased relative to said carrier.

5. The starter assembly according to claim 3, wherein said release plunger is movable between a first position wherein said latch is prevented from moving, and a second position wherein said latch is permitted to move.

6. The starter assembly according to claim 1, wherein said key is movable between a first engaged position wherein said key engages said carrier, and a second engaged position wherein when a force is exerted by said key on said carrier, said latch is caused to move between said first latch position and said second latch position.

7. The starter assembly according to claim 1, wherein said latch includes a latch body and a latch arm extending outward of said latch body.

8. The starter assembly according to claim 7, wherein said arm includes a transversely extending lip at a distal end thereof.

9. The starter assembly according to claim 8, wherein said lip engages an inner wall of said key cavity when said latch is in said second latch position.

10. The starter assembly according to claim 1, wherein said latch cooperates with said opening in said first end wall when said latch is in said second latch position.

11. The starter assembly according to claim 10, wherein said second latch position defines a latched key position.

12. The starter assembly according to claim 1, wherein said first latch position defines a unlatched position; and
wherein said second latch position defines a latched position, such that said latch engages said key within said key cavity, thereby latching said key to said carrier.

13. The starter assembly according to claim 1, wherein said key is slidably movable through said key opening of said carrier and along said axis of said key.

14. A starter assembly for a vehicle comprising:
a housing adapted to be coupled to a vehicle ignition system;
a carrier having a key opening and movably mounted within said housing;
a latch pivotably mounted to said carrier and movable between a first latch position and a second latch position;
a release plunger slidably mounted adjacent said latch, and movable between a first position wherein said latch is prevented from moving, and a second position wherein said latch is permitted to move; and
an electronic key having a first end having an opening, a second end, and a longitudinal axis, said key being received in said key opening of said carrier, said latch having a portion that selectively extends through said opening of said electronic key.

15. The starter assembly according to claim 14, wherein said first end of said key includes a first end wall, said first end wall having an opening defining an axially extending cavity therein.

16. A starter assembly for a vehicle comprising:
a housing adapted to be coupled to a vehicle ignition system;
a carrier having a key opening and movably mounted within said housing;
a latch mounted relative to said carrier and movable between a first latch position and a second latch position; and
an electronic key including a hollow body defining an enclosed cavity that extends through said key opening of said carrier, said hollow body having an opening that provides access to said enclosed cavity, said latch extending through said opening into said enclosed cavity.

17. The starter assembly according to claim 16, wherein said latch engages said hollow body of said electronic key in the first latch position and does not engage said hollow body of said electronic key in the second latch position.

* * * * *